United States Patent [19]
Takekoshi

[11] 3,920,697
[45] Nov. 18, 1975

[54] METHOD FOR PREPARING N-SUBSTITUTED NITROPHTHALIMIDES

[75] Inventor: Tohru Takekoshi, Scotia, N.Y.
[73] Assignee: General Electric Company, Schenectady, N.Y.
[22] Filed: June 22, 1973
[21] Appl. No.: 372,772

[52] U.S. Cl............................................. 260/326 N
[51] Int. Cl.² ...................................... C07D 209/34
[58] Field of Search................................. 260/326 N

[56] References Cited
UNITED STATES PATENTS
3,712,907  1/1973  Gilch et al. ..................... 260/326 A FOREIGN PATENTS OR APPLICATIONS
19,858   8/1969   Japan................................. 260/326

Primary Examiner—Elbert L. Roberts
Attorney, Agent, or Firm—William A. Teoli; Joseph T. Cohen; Jerome C. Squillaro

[57] ABSTRACT

Bis(nitrophthalimide)s can be prepared by effecting reaction in a phenolic solvent between an organic diamine and a nitro-substituted phthalimide or a nitro-substituted phthalic acid. The bis(nitrophthalimide)s can be employed as intermediates for making polyetherimides by a nitro displacement reaction with a diphenoxide.

8 Claims, No Drawings

METHOD FOR PREPARING N-SUBSTITUTED NITROPHTHALIMIDES

The present invention relates to a method for making bis(nitrophthalimido) compounds by the employment of a phenolic solvent to facilitate reaction between organic diamine and nitrophthalic compound such as a nitrophthalic anhydride or a nitrophthalic acid.

Bis(nitrophthalimide)s of the formula (I) 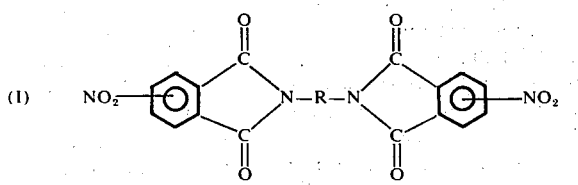

have been prepared by reacting organic diamines with nitrophthalic anhydrides in various organic solvents. For example, as shown in Japanese Patent 19,858,169, an organic diamine and 4-nitrophthalic anhydride was reacted for 3 hours in N-methylpyrrolidone at a temperature of about 200°C. During the reaction, the conditions were often so extreme that partial decomposition of the bis(nitrophthalimide) occurred requiring an added separation step. As shown in copending application, Ser. No. 177,166, filed Sept. 1, 1971, of Joseph G. Wirth and Darrell R. Heath, the bis(nitrophthalimido) compounds of formula I also can be made by the use of acetic acid or glacial acetic acid to facilitate reaction between the nitrophthalic anhydride and the organic diamine. Even though valuable results are achieved with respect to obtaining high yields of the desired bis(nitrophthalimido) compounds, those skilled in the art know that the employment of acetic acid often results in undesirable side reactions such as the partial acetylation of the amino function by reaction between the acetic acid and the amide-acid intermediate. Since bis(nitrophthalimido) compounds are extremely insoluble in acetic acid a large quantity of solvent is required. In addition, extremely long reaction times such as 10 hours or more are often required to complete the reaction.

The present invention is based on the discovery that reaction can be effected between nitrophthalic compounds and organic diamines to form bis(nitrophthalimide)s in a relatively short period of time, such as about one hour or less if a phenolic solvent is used. Inasmuch as phenolic solvents are better solvents for bis(nitrophthalimido) compounds than acetic acid, less amount, usually one to two parts by weight of the total reactants, can be employed. In addition, temperatures below 200°C can be used such as temperatures between 130°–160°C. As used hereinafter, the term "phenolic solvent" includes mixtures of o-, p-, and m-cresols known as cresylic acid and mixtures of cresylic acid with phenol. Additional phenolic solvents also include 2,4- and 2,6-xylenol, chlorinated phenols such as orthochlorophenol, etc.

In addition to providing improved reaction times and lower temperatures over acetic acid or N-methylpyrrolidone, to make the bis(nitrophthalimide)s of formula I, the use of phenolic solvent allows for the use of nitrophthalic acids in addition to nitrophthalic anhydride as the nitrophthalic compound.

There is provided by the present invention a method for making a bis(nitrophthalimide) of formula I which comprises, 1. effecting reaction between an organic diamine of the formula (II)

$NH_2RNH_2$, 

and a nitrophthalic compound selected from the group of nitrophthalic acids and nitrophthalic anhydrides in the presence of a phenolic solvent, and 2. recovering said bis(nitrophthalimide) from the resulting mixture of (1), where R is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula,

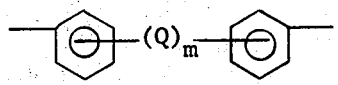

where Q is a member selected from the class consisting of

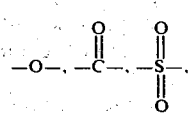

$-S-$, $-C_xH_{2x}-$ and $x$ is a whole number from 1 to 5 inclusive, and $m$ is 0 or 1.

Nitrophthalic compounds which can be employed in the practice of the invention are 3-nitrophthalic anhydride, 4-nitrophthalic anhydride, 3-nitrophthalic acid and 4-nitrophthalic acid. Organic diamines included by formula II are, for example, m-phenylenediamine;
p-phenylenediamine;
4,4'-diaminodiphenylpropane;
4,4'-diaminodiphenylmethane; benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;

1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
4,4'-diaminobenzophenone;
nonamethylenediamine;
decamethylenediamine;
bis(3-aminopropyl)tetramethyldisiloxane;
bis(4-aminobutyl)tetramethyldisiloxane; etc.

In the practice of the invention reaction is effected between the organic diamine and the nitrophthalic compound in the presence of a phenolic solvent.

Substantially equal molar amounts of the organic diamine and the nitrophthalic compound are preferably employed. However, in particular instances a proportion of from 0.8 to 1.2 moles of organic diamine per mole of nitrophthalic compound will provide for effective results. Temperatures in the range of between 100°C to 170°C can be used and preferably from 130°C to 140°C. Stirring or agitating is employed during the reaction to facilitate contact between the reactants.

It has been found that to facilitate the removal of water of reaction during the formation of the bis(nitrophthalimide)s, a non-polar, low boiling solvent such as benzene, chlorobenzene, toluene, etc. can be used as an azeotroping agent.

At the temperature of the reaction which can last from about 0.2 hours or less to 2 hours or more, depending upon such factors as the reactants, degree of agitation, temperature, etc. the reaction mixture can be allowed to cool to produce a solution of the bis(nitrophthalimide). Recovery of the desired product can be achieved by stripping the mixture of the phenolic solvent under reduced pressure or by adding to the mixture a precipitating solvent such as methanol, etc. in accordance with standard procedures. Filtration of the precipitate from the mixture followed by washing with additional methanol can be used to purify the product.

The following examples are given by way of illustration and not by way of limitation. All parts are by weight.

EXAMPLE 1

There were added 38.62 parts of 3-nitrophthalic anhydride, and 20.02 parts of 4,4'-diaminodiphenylether to a mixture of 50 parts of meta-cresol and 30 parts of toluene. The mixture was stirred and heated to reflux at a temperature between 120°–125°C under nitrogen. Water was removed by azeotropic distillation. The reaction was completed within about 70 minutes. Bright yellow crystals were obtained when the mixture was allowed to cool to room temperature. The product was filtered and washed with acetone and dried under vacuum at 100°C. There was obtained a yield 95.3 percent. Based on method of preparation the product was 4,4'-bis(3-nitrophthalimido)diphenyl ether.

EXAMPLE 2

A mixture of 19.31 parts of 3-nitrophthalic anhydride, 19.31 parts of 4-nitrophthalic anhydride, 19.83 parts of 4,4'-diaminophenylmethane, 40 parts of orthochlorophenol and 20 parts of toluene was stirred and heated to reflux under nitrogen for one hour. During reflux water of reaction was removed azeotropically. The reaction mixture was then heated for an additional 40 minutes employing a molecular sieve to insure complete dehydration. During reaction the temperature was maintained at about 140°–143°C. At the termination of the reaction the solvent was stripped under vacuum and the residual crystalline product was washed with about 200 parts of boiling methanol. There was obtained about 99.3 percent yield of a light yellow crystalline powder, which had been dried at 100°C under vacuum. Based on method of preparation the product was a mixture of isomeric 4,4'-bis-(nitrophthalimido)-diphenylmethanes.

A mixture of equal molar amounts of the above bis(-nitrophthalimido) compound and the sodium dianion of bisphenol-A in N,N-dimethylformamide is heated at a temperature of about 70°C for 1 hour. The mixture is then added to a large excess of methanol to effect the precipitation of product. Based on method of preparation the product is a polyetherimide useful as an injection molding compound.

EXAMPLE 3

A mixture of 140 parts of 4-nitrophthalic anhydride, 72.58 parts of 4,4'-diaminodiphenylether, 250 parts of phenol, and about 200 parts of toluene was heated to reflux. A part of the toluene was distilled off until the temperature of the mixture reached 140°C. The heating at reflux was continued for 1.5 hours during which time water was continuously azeotroped off. The reaction mixture was allowed to cool to room temperature, diluted with about 500 parts of toluene and then filtered. There was obtained a 96.5 percent yield of yellow crystals after the residue was washed with acetone and dried. The melting point of the product was 322°–323°C. Based on method of preparation, the product was a bis(nitrophthalimide) of the formula,

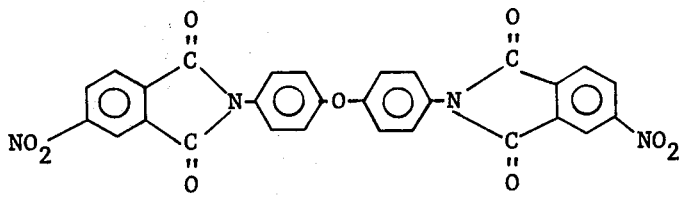

EXAMPLE 4

A mixture of 42.23 parts of 3-nitrophthalic acid, 20.02 parts of 4,4'-diaminodiphenylether, about 50 parts of meta-cresol and about 25 parts toluene was heated to reflux. The mixture reached a temperature of about 140°C after about 9 parts of toluene had distilled off. The mixture was heated at this temperature for 2½ hours to effect the complete separation of water by azeotropic distillation. The mixture was then allowed to cool to room temperature, diluted in about 500 parts of methanol and filtered. There was obtained orange crystals when the residue was washed with methanol and dried. The yield of product was 94.3 percent. Based on method of preparation the product was a bis(nitrophthalimide) of the formula

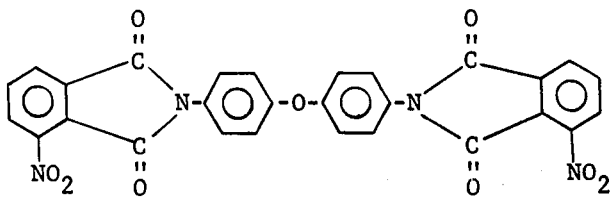

The above procedure is repeated except there is employed in place of the meta-cresol, an equivalent weight of acetic acid. It is found that the mixture cannot be stirred. There is then employed about a ten-fold excess of acetic acid and the mixture is refluxed for 20 hours.

The mixture is then allowed to cool to room temperature. A precipitate is isolated by filtration and extracted with hot acetone. There is obtained a 90 percent yield of the above bis(nitrophthalimide). On stripping the acetone extract, there is obtained 5 percent yield of a solid which was identified as 4-acetamido-4'-(3-nitrophthalimido)diphenyl ether by IR and $C^{13}$ nmr spectroscopies.

The above procedure utilizing meta-cresol is repeated except in place of meta-cresol there is employed 500 parts of N-methylpyrrolidone. The mixture is heated at a temperature of about 200°C for 10 hours. There is obtained a crystalline product when the mixture is poured into methanol following the same procedure. It is found the above described bis(nitrophthalimide) is obtained except that it is found to contain a considerable amount of impurities and not suitable as a monomer to produce polyetherimide without prior purification.

Although the above examples illustrate a few of the very many phenolic solvents and reactants which can be employed in the practice of the method of the present invention, it should be understood that the present invention is directed to a much broader variety of reactants and conditions which are set forth in the description preceding these examples.

What I claim as new and desire to secure by letters Patent of the United States is:

1. A method for making a bis(nitrophthalimide) of the formula

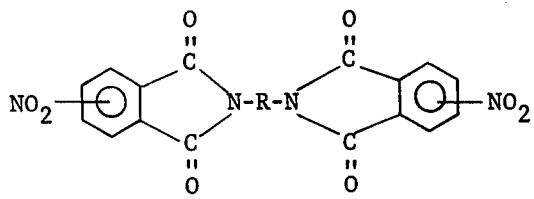

which comprises, 1 effecting reaction at a temperature in the range of from 100°C. to 170°C. between an organic diamine of the formula,
   $NH_2RNH_2$.
and a nitrophthalic compound selected from the group of nitrophthalic acids and nitrophthalic anhydrides in the presence of a phenolic solvent, and 2 recovering said bis(nitrophthalimide) from the resulting mixture of (1), where R is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula

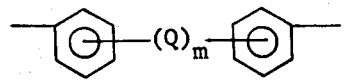

where Q is a member selected from the class consistig of

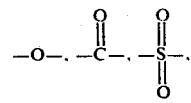

—S—, —$C_xH_{2x}$— and $x$ is a whole number from 1 to 5 inclusive, and $m$ is 0 or 1.

2. A method in accordance with claim 1 where the nitrophthalic compound is 3-nitrophthalic anhydride.

3. A method in accordance with claim 1 where the nitrophthalic compound is 4-nitrophthalic anhydride.

4. A method in accordance with claim 1 where the nitrophthalic compound is 3-nitrophthalic acid.

5. A method in accordance with claim 1 where the nitrophthalic compound is 4-nitrophthalic acid.

6. A method in accordance with claim 1 where the organic amine is methylenedianiline.

7. A method in accordance with claim 1 where the organic amine is oxydianiline.

8. A method in accordance with claim 1, where the nitrophthalic compound is a mixture of 3- and 4- nitrophthalic compounds.

* * * * *